J. F. MOLLOY.
CLASP FOR SUSPENDERS.
No. 10,964. Reissued Oct. 30, 1888.
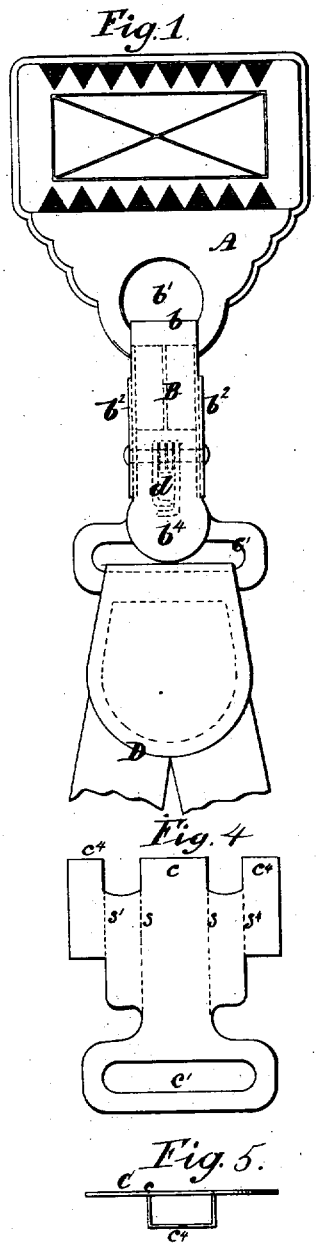
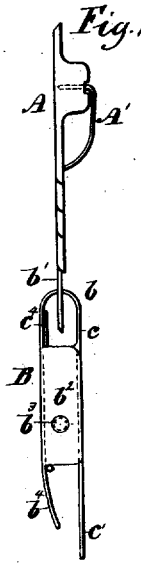
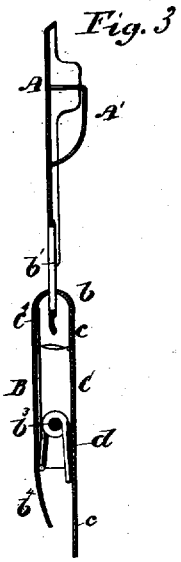
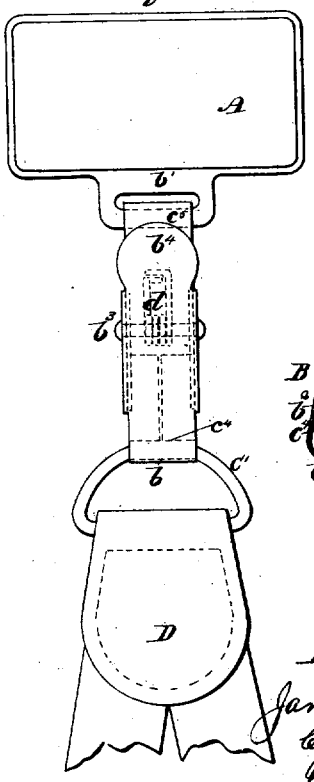
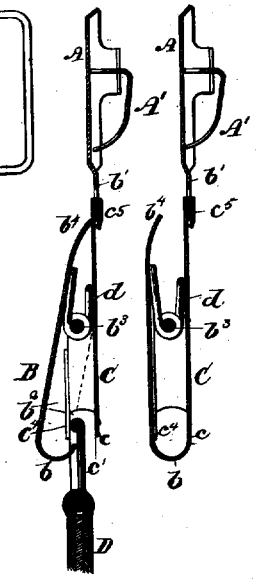
Witnesses:
Chas. B. Shumway.
Harry Hall.
Inventor:
James F. Molloy
by his attorney
Geo. O. Seymour.
N. PETERS, Photo-Lithographer, Washington, D. C.

UNITED STATES PATENT OFFICE.

JAMES F. MOLLOY, OF WEST HAVEN, CONNECTICUT.

CLASP FOR SUSPENDERS.

SPECIFICATION forming part of Reissued Letters Patent No. 10,964, dated October 30, 1888.

Original No. 364,365, dated June 7, 1887. Application for reissue filed September 13, 1888. Serial No. 285,341.

*To all whom it may concern:*

Be it known that I, JAMES F. MOLLOY, of West Haven, in the county of New Haven and State of Connecticut, have invented a new and useful Improvement in Spring-Clasps or Snap-Hooks for Suspenders and other Purposes, of which the following is a specification.

My invention more particularly relates to the spring-clasps or snap-hooks which are employed in suspenders to secure an adjustable connection between the buckle and tabs; but such a clasp may be employed for other purposes. As heretofore constructed clasps or snap-hooks of this character have been provided with a pivoted spring-actuated tongue for closing the hook, and any twisting strain upon the ring or loop with which the hook engages has caused the spring-tongue to be moved outward from the beak or point of the hook and the loop or ring to be disengaged from the hook.

Important objects of my invention are to provide a guard which is rigidly connected with the tongue proper and so arranged with relation to the tongue and hook that any twisting strain produced by the ring or loop with which the hook engages will be taken between the tongue and guard, and will not result in the tongue being sprung away from the hook.

A further object of the invention is to provide for automatically casting out or casting off the ring or loop from the hook when the tongue is swung away from the hook.

To secure the above described results, I combine with the hook a pivoted and spring-actuated tongue having at the end a fork which is presented toward the bend of the hook, and one member of which serves to close the hook, while the other member serves as a guard to prevent twisting strain from the ring or other device from coming upon the hook. This guard, being connected with the tongue proper, so as to move simultaneously therewith, constitutes a casting-off device for moving the ring or loop laterally out of the hook when the tongue proper is swung away from the hook.

In constructing my improved device the tongue-piece, from which are formed the tongue proper and the guard or casting-off device, may be produced from a sheet-metal blank bent into box-like form, and having at the end which is presented toward the bend of the hook and at the front and back projecting lips or members, which constitute, respectively, the tongue proper and casting-off device.

In the accompanying drawings, Figure 1 represents a suspender-buckle and tabs connected detachably therewith by my improved device, the spring-clasp or snap-hook being adjustably engaged with the ring or loop upon the buckle-frame. Fig. 2 is an edge view of the buckle and spring-clasp or snap-hook. Fig. 3 is a vertical section of such parts. Fig. 4 represents a blank from which the tongue-piece employed in connection with the hook may be produced; and Fig. 5 is an end view of such tongue-piece after it is completed, but before its connection with the hook. Fig. 6 is a view corresponding to Fig. 1, but with the spring-clasp or snap-hook reversed in position and detachably engaged with a ring or loop from which the tabs are hung. Fig. 7 is a vertical section of the parts shown in Fig. 6, the hook being closed by the spring-tongue; and Fig. 8 is a similar section showing the tongue as swung outward from the hook and illustrating the operation of the casting-off device.

Similar letters of reference designate corresponding parts in all the figures.

A designates the frame, and A′ the lever, of a buckle, with which the snap-hook or clasp, in this example of the invention, is engaged. The device to which my invention relates is composed, essentially, of two parts, B C. The part B has its end bent or turned backward upon itself to constitute the beak $b$ of the hook, and the part C has a projection or lip, $c$, which constitutes the tongue proper for the hook. As here represented the hook $b$ engages a ring or loop, $b'$, formed upon the buckle-frame A. The hook-piece B of the device has flanges $b^2$, which are bent transversely to its face, and with which the part C is connected by a pivot, $b^3$, to which a spring, $d$, is applied. The part B is here represented as having a projection, $b^4$, at the end opposite the hook to form a thumb-piece. The part C has a loop, $c'$, formed in it for the attachment of the tabs D.

A preferred form of tongue-piece C will be best understood from Figs. 4 and 5. Fig. 4 represents the blank, and Fig. 5 represents an end view thereof after the blank is bent into proper shape. In the blank C are formed holes $c^2$, which receive the pivot $b^3$. The blank is bent upon the dotted lines $s$ $s'$ to give it above the loop $c'$ the box-like form represented in Fig. 5, and this box-like portion of the part C is received between the flanges $b^2$ on the part B.

At the middle of the blank C is a projecting lip or member, $c$, and at the edges are similar but narrower projecting lips or members, $c^4$, and when the blank is bent into box-like form the two parts $c^4$ form a single member, which is parallel with and of about the same width as the lip $c$. The lip $c$ constitutes, in effect, the tongue proper, which closes the beak $b$ of the hook, and the lip or member $c^4$ constitutes a guard which rests normally against the back of the hook, as shown in Figs. 2 and 3, thus giving the end of the part C the form of a fork movable laterally across the point or edge of the hook.

From Fig. 2 it will be seen that any twisting strain of the ring or loop $b'$ upon the snap-hook will be taken on one side by the tongue proper, $c$, and on the other side by the lip or member $c^4$, which constitutes a guard, and, these parts being formed in the same piece or maintained in fixed relation to each other, such twisting strain will have no tendency to spring the tongue proper, $c$, away from the hook.

In the example of the invention shown in Figs. 6, 7, and 8 the snap-hook or spring-clasp is reversed in position, and has at the upper end of the tongue-piece C a projection or lip, $c^5$, which is permanently engaged with the loop $b'$ upon the buckle-frame, and the hook $b$ of the device engages a loop or ring, $c'$, from which the tabs D hang.

In Fig. 8 I have shown more clearly the function of the guard or lip $c^4$ as a casting-off device. When pressure is applied to the thumb-piece $b^4$ of the part B to spring the tongue proper, $c$, away from the hook $b$, the forked end of the piece C, which is formed by the tongue $c$ and the guard $c^4$, is moved laterally across the point or edge of the hook, and by lateral pressure against the ring or loop $c'$ the guard or member $c^4$ pushes it laterally out of the hook. In Fig. 8 I have represented the ring or loop $c'$ as just passing over the edge or point of the hook.

The interior member of the fork lies against and above the inner face of the shank of the hook and takes therefrom the twisting strain of whatever may be in the clasp.

The bow of the hook extends beyond both members of the fork, the ends whereof fall within its beak, whereby they are protected against being caught on clothing with the danger of tearing the same and opening the clasp. This last is an important and essential point in making fasteners or clasps for personal wear.

I am aware of Letters Patent of the United States, dated December 21, 1875, numbered 171,361, and granted to Charles Dudley, for an improvement in snap-hooks, and do not broadly claim the combination of a hook and a two-pronged fork, but only when the interior member of the fork lies upon and above the inner face of the shank of the hook, when the bow of the hook extends beyond the ends of the members of the fork, and when the fork is made as specified herein.

What I claim as my invention, and desire to secure by Letters Patent, is—

1. The combination, with a hook, of a pivoted and spring-actuated tongue having at the end a fork which is presented toward the bend of the hook, and one member of which serves to close the hook and the other member of which lies against and above the inner face of the shank of the hook and serves as a guard to prevent twisting strain from a ring or other device from coming upon the hook, substantially as herein described.

2. In the spring-clasp herein described, the combination, with a hook, of a pivoted spring-actuated tongue for closing the hook and a casting-off device lying normally at the back of the hook and connected with the tongue, so as to move simultaneously therewith for casting off a ring or loop or analogous device from the hook, the bend of which extends beyond the tongue and protects the same, substantially as herein described.

3. The combination, with the hook-piece B, of the tongue-piece C, consisting of a sheet-metal blank bent into box-like form pivoted to the hook-piece and spring actuated, and having at the end which is presented toward the bend of the hook and at the front and back the lips and members $c$ $c^4$, substantially as herein described.

In testimony whereof I have signed this specification in the presence of two subscribing witnesses.

JAMES F. MOLLOY.

Witnesses:
H. J. D. WHIPPLE,
H. G. HOTCHKISS.